Feb. 26, 1952 — A. A. LOMBARD — 2,587,345
SUPPORT FOR INTERNAL-COMBUSTION ENGINES
Filed Jan. 20, 1947 — 2 SHEETS—SHEET 1
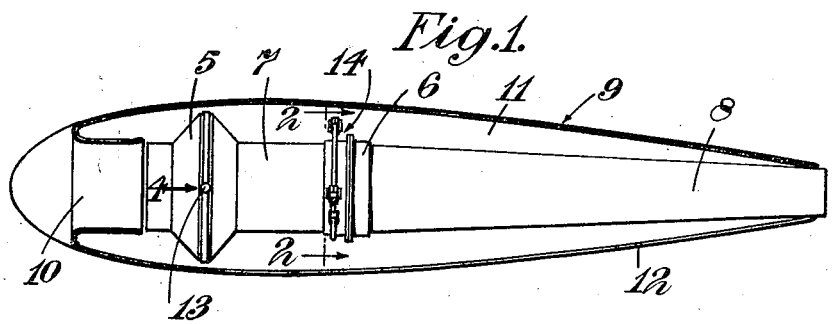
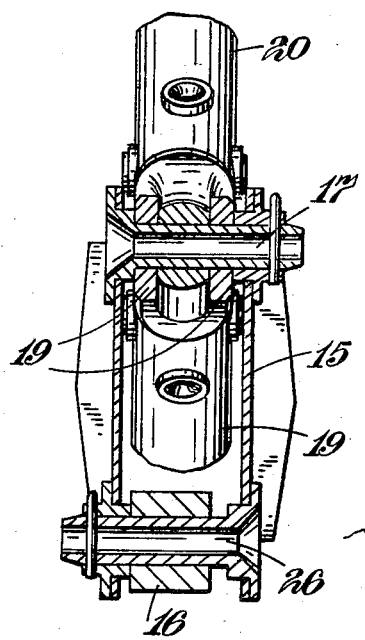
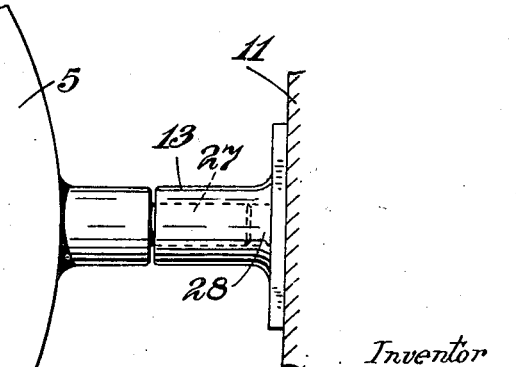
Inventor
Adrian A. Lombard
by Wilkinson & Mawhinney
Attorneys

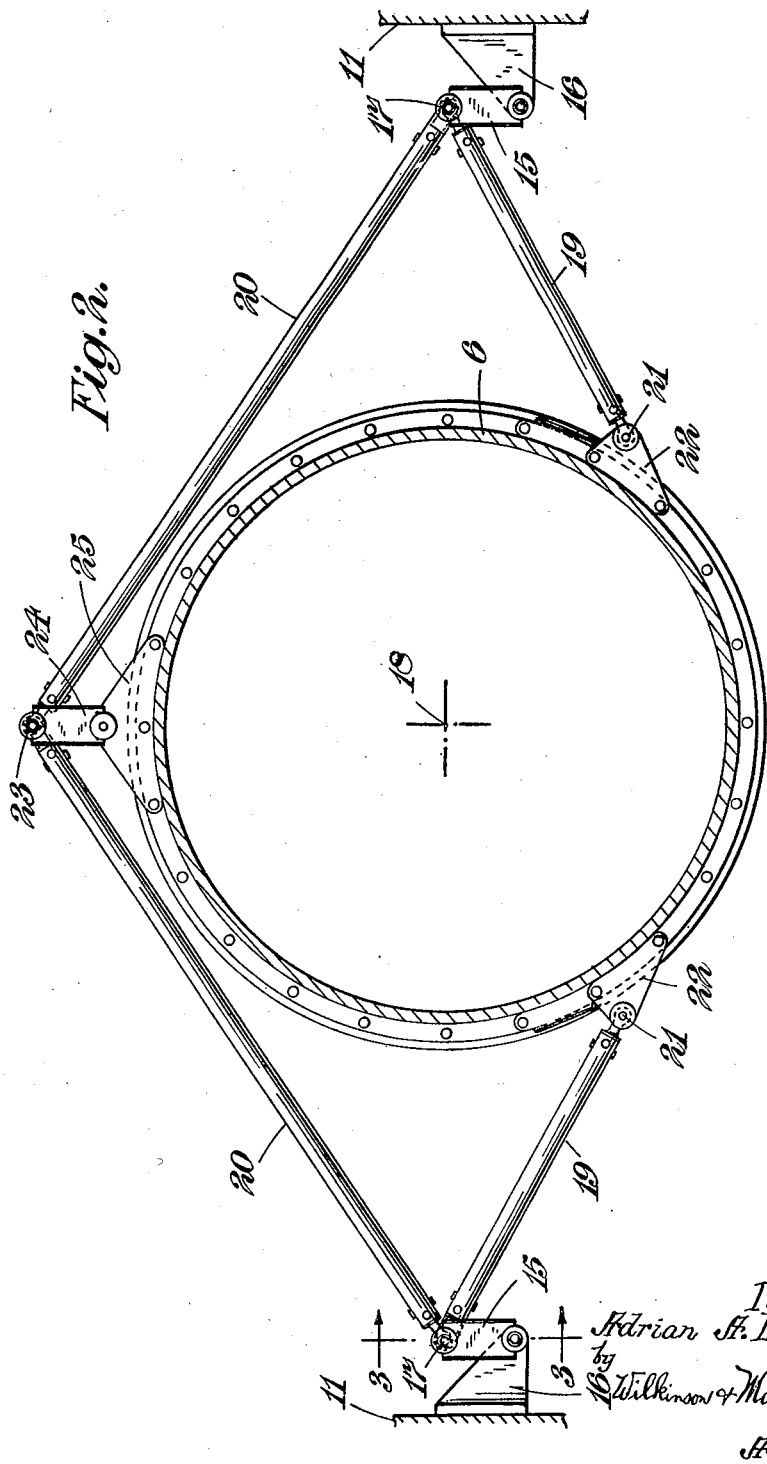

Patented Feb. 26, 1952

2,587,345

UNITED STATES PATENT OFFICE 2,587,345

SUPPORT FOR INTERNAL-COMBUSTION ENGINES

Adrian Albert Lombard, Clitheroe, England, assignor to Rolls-Royce Limited, Derby, England, a British company Application January 20, 1947, Serial No. 723,156
In Great Britain March 26, 1946

13 Claims. (Cl. 248—5)

1

This invention relates to mountings for gas turbine or jet propulsion engines and has for its object to provide an improved means for mounting such an engine on a structure, for instance an aircraft wing which is subjected to loads causing it to deflect. A gas turbine or jet propulsion engine is usually supported in an aircraft wing by a forward two point mounting and a rearward two point mounting from the wing rib structure. Deflection of the wing results in the line through the rear points of support twisting relatively to that through the front points of the support and this twisting movement is resisted by the engine structure which is thus subjected to torsional loads.

According to the present invention means for mounting a gas turbine or jet propulsion engine on a supporting structure comprises two mountings supporting it at different places along its length, characterised in that one of the mountings provides freedom for the engine to turn about its axis relatively to the supporting structure and comprises a linkage system connected to the supporting structure at at least two points, and that the other of the mountings provides no such freedom.

According to another feature of the invention a mounting for a gas turbine or jet propulsion engine may comprise two links articulated to the lower part of the engine and extending sideways and upwards from the engine, a pair of struts each articulated at a lower end to the free end of one of said links, the one to the one of the links and the other to the other and having their free ends articulated together above the top of the engine and connected by a shackle to the top of the engine and a shackle at each side of the engine supporting the articulation of the link and strut at that side on a supporting structure. Preferably one articulation at each side of the engine is arranged to provide axial freedom of movement to accommodate the expansion of the engine when it is running.

In order that the nature of the invention may be more readily understood a practical application thereof will now be described with reference to the accompanying drawings whereof:

Figure 1 is a diagrammatic side view of a jet engine mounted in the wing of an aeroplane in accordance with this invention, Figure 2 is a section, to a larger scale, on the line 2—2 of Figure 1, Figure 3 is a section, also to a larger scale, on the line 3—3 of Figure 2, and Figure 4 is a scrap view of a detail of the mounting as viewed in the direction of arrow 4 of Figure 1.

Referring to Figure 1: the jet propulsion engine comprises a compressor 5, a turbine 6, a connecting member 7 therebetween, a plurality of combustion chambers (not shown) and a jet pipe 8. The engine is buried in a wing, generally indicated by the numeral 9, having a forwardly facing intake 10 through which air passes to the compressor. The wing 9 is built from a plurality of ribs 11 (one only of which is seen in Figure 1) and a skin 12. The jet pipe passes through the skin at the trailing edge of the wing.

In accordance with this invention the jet engine is carried by the pair of ribs 11 between which it lies within the wing. To this end the compressor 5 is mounted on each rib by a trunnion 13 disposed at diametrically opposite sides of the compressor. Each trunnion 13 comprises (as shown in Figure 4) a cylindrical journal 27 attached to the compressor 5, and a bearing element 28 which is attached to a rib 11, and has a bore adapted to receive the journal 27. The trunnions have a common horizontal axis transverse to the long axis of the engine so that the latter is without freedom to turn about its own axis relatively to the wing or to move laterally in the wing. It can, however, rock about the trunnion axes in a vertical plane.

The engine is also mounted on the ribs 11 at its rear end by a structure generally indicated at 14, Figure 1. The structure comprises a pair of shackles 15 each of which is pivoted to a bracket 16 secured to one of the ribs 11 one at either side of the turbine. The shackles 15 extend upwardly so that their upper pivot pins 17 are on a horizontal line through the engine axis 18, Figure 2. A link 19 and a strut 20 are articulated to pin 17 of each shackle 15.

The two links 19 extend downwardly and inwardly and are articulated at 21 to a bracket 22 bolted to the engine. In order to reduce weight and also to distribute the loading more equally around the engine it is preferred to employ links 19 which are articulated as shown in Figure 2. The links 19 may be, however, of such length that they are both articulated to the engine at the same point on the vertical plane passing through the axis 18.

The two struts 20 extend upwardly to define an inverted V over the engine 6 and their upper ends are articulated together at 23 and to the upper end of a shackle 24 of which the lower end is articulated to a bracket 25 bolted to the engine 6.

The shackles 15 permit the engine to move laterally and the engine will be located in this respect solely by the trunnions 13. The engine can turn about axis 18, this being permitted by shackles 15, 24 links 19 and struts 20: when this turning occurs there is a vertical flattening of the four-sided figure formed by struts 20 and links 19. When the engine turns about axis 18 relatively to the wing the parallelogram defined by struts 20 and links 19 becomes displaced sideways relatively to engine and wing, the shackles 15 being so pivoted as to permit this. The rear mounting 14 thus supports the engine with freedom to turn relatively to the wing structure without the engine being moved relatively to the wing. Such turning of the engine may be accompanied by a small vertical movement which is permitted by trunnions 13.

From what has been said it will be seen that the engine is mounted in wing 9 so that it will not be subjected to torsional loading as a result of deflection of the wing and without any material movement of axis 18 as a result of such deflection. In addition the risk of undesirable changes in the clearances between the engine and the wing structure, particularly those adjacent the jet pipe 8, is reduced and the risk of damage to external drives from the turbine is minimised.

The shackles 15 are mounted on brackets 16 by pins 26 (Figure 3) and the width of the bracket is less than the free length of pin 26 so that the pins can slide axially in the brackets 16 to accommodate the axial expansion of the engine when it is in operation. The mounting does not provide any constraint to radial expansion of the engine and allows such expansion without displacing the engine axis 18 to any material extent so that the mounting can be attached to the shroud ring of the turbine 6 (as is shown in Figure 1) which expands considerably when the engine is hot.

I claim:

1. Means for mounting a gas turbine engine in a supporting structure, comprising a first mounting including a first pair of coaxial trunnion members disposed on an axis transverse to the longitudinal axis of the engine rigidly connected to the engine and a co-operating pair of members rigidly connected to the supporting structure, whereby said pairs of members co-operate to permit relative rotation of the engine with respect to the structure about said transverse axis but restrain rotational movement about said longitudinal axis; and a second mounting spaced apart from said first mounting longitudinally of the engine and including two pairs of struts, the struts in each pair of struts being articulated together at one end, supporting means to support said ends of said struts from the supporting structure with freedom to move substantially in a plane passing through the longitudinal axis of the engine, and pivotal connecting means connected to the other ends of said struts and to said engine, at least one of said connecting means comprising a swinging link between a strut and the engine.

2. Means for mounting a gas turbine engine in a supporting structure comprising a first mounting including a first pair of coaxial trunnion members disposed on an axis transverse to the longitudinal axis of the engine rigidly connected to the engine, and a co-operating pair of members rigidly connected to the supporting structure, whereby said pairs of members cooperate with each other to permit relative rotation of the engine with respect to the structure about said transverse axis but restrain rotational movement about said longitudinal axis, and a second mounting spaced apart from said first mounting longitudinally of the engine and including two pairs of struts, both struts of each pair being articulated together at their ends remote from the engine and one strut of each of said pairs being articulated together at their ends adjacent the engine, supporting means to support the first said ends of said struts from the supporting structure with freedom to move substantially in a plane passing through the longitudinal axis of the engine, and pivotal connecting means connected to the other ends of said struts and to said engine, including a shackle by which the articulated ends adjacent the engine of said two struts are connected to the engine.

3. Means for mounting a gas turbine engine in a supporting structure comprising a first mounting including a first pair of coaxial trunnion members disposed on an axis transverse to the longitudinal axis of the engine rigidly connected to the engine and a co-operating pair of members rigidly connected to the supporting structure, whereby said pairs of members co-operate with each other to permit relative rotation of the engine with respect to the structure about said transverse axis, but restrain rotational movement about said longitudinal axis, and a second mounting spaced apart from said first mounting longitudinally of the engine and including two pairs of struts, each strut of each said pair being articulated together at their ends remote from the engine and one strut of each of said pairs being articulated together at their ends adjacent the engine, supporting means to support the first said ends of said struts from the supporting structure with freedom to move substantially in a plane passing through the longitudinal axis of the engine, and pivotal connecting means connected to the other ends of said struts and to said engine, including a shackle by which the articulated ends adjacent the engine of said two struts are connected to the engine, and wherein the other struts of said pairs are directly articulated to the engine.

4. Means for mounting a gas turbine engine in a supporting structure comprising a first mounting including a first pair of coaxial trunnion members disposed on an axis transverse to the longitudinal axis of the engine rigidly connected to the engine, and a co-operating pair of members rigidly connected to the supporting structure, whereby said pairs of members cooperate with each other to permit relative rotation of the engine with respect to the structure about said transverse axis, but restrain rotational movement about said longitudinal axis, and a second mounting spaced apart from said first mounting longitudinally of the engine and including two pairs of struts, each strut of each said pair being articulated together at their ends remote from the engine and one strut of each of said pairs being articulated together at their ends adjacent the engine, a pair of shackles to which the first said ends of said struts are articulated and which are themselves articulated to the supporting means to support said ends of said struts from the supporting struts with freedom to move in a plane passing through the longitudinal axis of the engine, a shackle connected to the articulated ends adjacent the engine of said two struts and pivotally connected at its other end to the engine, and pivotal connections between the other struts of said pairs and said engine.

5. A mounting for mounting a gas-turbine engine in a supporting structure said mounting comprising a first shackle on one side of said engine, a first pivotal connection between one end of said shackle and said supporting structure, a first link, a second pivotal connection between one end of said first link and the other end of said first shackle, a third pivotal connection between the other end of said first link and the lower part of said engine, said first link extending upwardly and sideways from the lower part of said engine, a second shackle on the other side of said engine, a fourth pivotal connection between one end of said second shackle and said supporting structure, a second link, a fifth pivotal connection between the other end of said second shackle and one end of said second link, a sixth pivotal connection between the other end of said second link and the lower part of said engine, said second link extending upwardly and sideways from the lower part of said engine, a first strut, a seventh pivotal connection between the said other end of said first shackle and one end of said first strut, said first strut extending upwardly over the engine from said first shackle, a second strut, an eighth pivotal connection between the said other end of said shackle and one end of said second strut, said second strut extending upwardly over the engine from said second shackle, a ninth pivotal connection between the other end of said first strut and the other end of said second strut, a third shackle, a tenth pivotal connection between the said other ends of said first and second struts, and an eleventh pivotal connection between the other end of said third shackle and the top of the engine, the pivot-axes of said first, second, third, fourth, fifth, sixth, seventh, eighth, ninth and tenth pivotal connections being parallel with the pivot axis of said eleventh pivot axis.

6. A mounting according to claim 5 wherein one of said pivotal connections at each side of said engine is of kind providing relative freedom between the members which it connects in the direction of its pivot axis.

7. A mounting according to claim 5 wherein said first pivotal connection and said fourth pivotal connection are each of the kind providing relative freedom between the members which it connects in the direction of its pivot axis.

8. A mounting according to claim 5 wherein the pivot axis of said third pivotal connection is spaced from the pivot axis of said sixth pivotal connecton.

9. A mounting according to claim 5 wherein said first and second struts are of equal length said first and second links are of equal length, and said first and second shackles are of equal length.

10. A mounting according to claim 9 wherein the pivot axes of said second pivotal connection and said seventh pivotal connection are coaxial, wherein the pivot axes of said fifth pivotal connection and said eighth pivotal connection are coaxial, and wherein the pivot axes of said ninth pivotal connection and said tenth pivotal connection are coaxial.

11. A mounting according to claim 10 wherein said first pivotal connection and said fourth pivotal connection are each of the kind providing relative freedom between the members which it connects in the direction of its pivot axis.

12. Means for mounting an engine in supporting structure with freedom for limited angular rotation about an axis but with restraint against movement in a direction at right angles to said axis, comprising a first shackle pivotally connected at one end to said supporting structure, a first link pivotally connected at one end to the other end of said first shackle, and pivotally connected at its other end to said engine, a second shackle, pivotally ocnnected at one end to said supporting structure, a second link pivotally connected at one end to the other end of said second shackle and pivotally connected at its other end to said engine, a third shackle pivotally connected at one end to the engine, a first strut pivotally connected at one end to said other end of the first shackle and at its other end to the other end of said third shackle and a second strut pivotally connected at one end to said other end of the second shackle and at its other end to said other end of said third shackle.

13. Means for mounting an engine in supporting structure comprising mounting means as claimed in claim 12 and comprising also a pair of oppositely-extending substantially coaxial trunnions rigidly connected to the engine and spaced axially of the engine from said mounting means, and a cooperating pair of members rigidly connected to the supporting structure each to receive one of said trunnions.

ADRIAN ALBERT LOMBARD.

REFERENCES CITED

The following references are of record in the file of this patent:

UNITED STATES PATENTS

| Number | Name | Date |
|---|---|---|
| 1,373,546 | Zucker | Apr. 5, 1921 |
| 1,921,085 | Korrittke | Aug. 8, 1933 |
| 2,028,549 | Lord | Jan. 21, 1936 |
| 2,028,551 | Lord | Jan. 21, 1936 |